United States Patent [19]

Hill

[11] 4,243,199
[45] Jan. 6, 1981

[54] MOLD FOR MOLDING PROPELLERS HAVING TAPERED HUBS

[76] Inventor: Rodman K. Hill, 2879 Copely Ave., San Diego, Calif. 92116

[21] Appl. No.: 100,371

[22] Filed: Dec. 5, 1979

[51] Int. Cl.² .............................................. B29C 5/00
[52] U.S. Cl. .................... 249/142; 249/163; 249/164; 425/DIG. 5; 425/DIG. 58
[58] Field of Search ............... 249/56, 160, 161, 162, 249/163, 165, 142; 264/26; 425/DIG. 5, DIG. 58

[56] References Cited

U.S. PATENT DOCUMENTS

| | | | |
|---|---|---|---|
| 1,543,701 | 6/1925 | Dickey | 249/160 X |
| 1,770,368 | 7/1930 | Fahlman | 249/162 X |
| 1,783,285 | 12/1930 | Goodwin | 249/160 X |
| 2,448,640 | 9/1948 | Weston | 264/26 |
| 2,859,478 | 11/1958 | Glasson | 249/161 X |
| 3,136,001 | 6/1964 | Gelbard | 249/142 |
| 3,724,803 | 4/1973 | Goldfarb | 249/160 X |
| 3,837,612 | 9/1974 | Deters | 249/142 X |
| 4,043,385 | 8/1977 | Petrenchik | 425/DIG. 5 |
| 4,047,692 | 9/1977 | Savin | 249/142 |
| 4,133,371 | 1/1979 | Birch et al. | 249/163 X |

Primary Examiner—J. Howard Flint, Jr.
Attorney, Agent, or Firm—Brown & Martin

[57] ABSTRACT

Disclosed herein is a radially parted mold comprising a plurality of mold segments each having cavities that taken together define the shape of a propeller with a tapered hub when the mold segments are joined together along their parting surfaces. The parting surfaces include parting lines which run along the edge of the propeller blade. The edge of the propeller blade is the centerline of the blade (½ the thickness of the blade). There are the same number of mold segments as there are blades on the propeller and each mold segment has a first cavity defining the rear face of an adjacent propeller blade, a second cavity defining the rear face of an adjacent propeller blade, and a third cavity defining a portion of the propeller hub.

6 Claims, 5 Drawing Figures

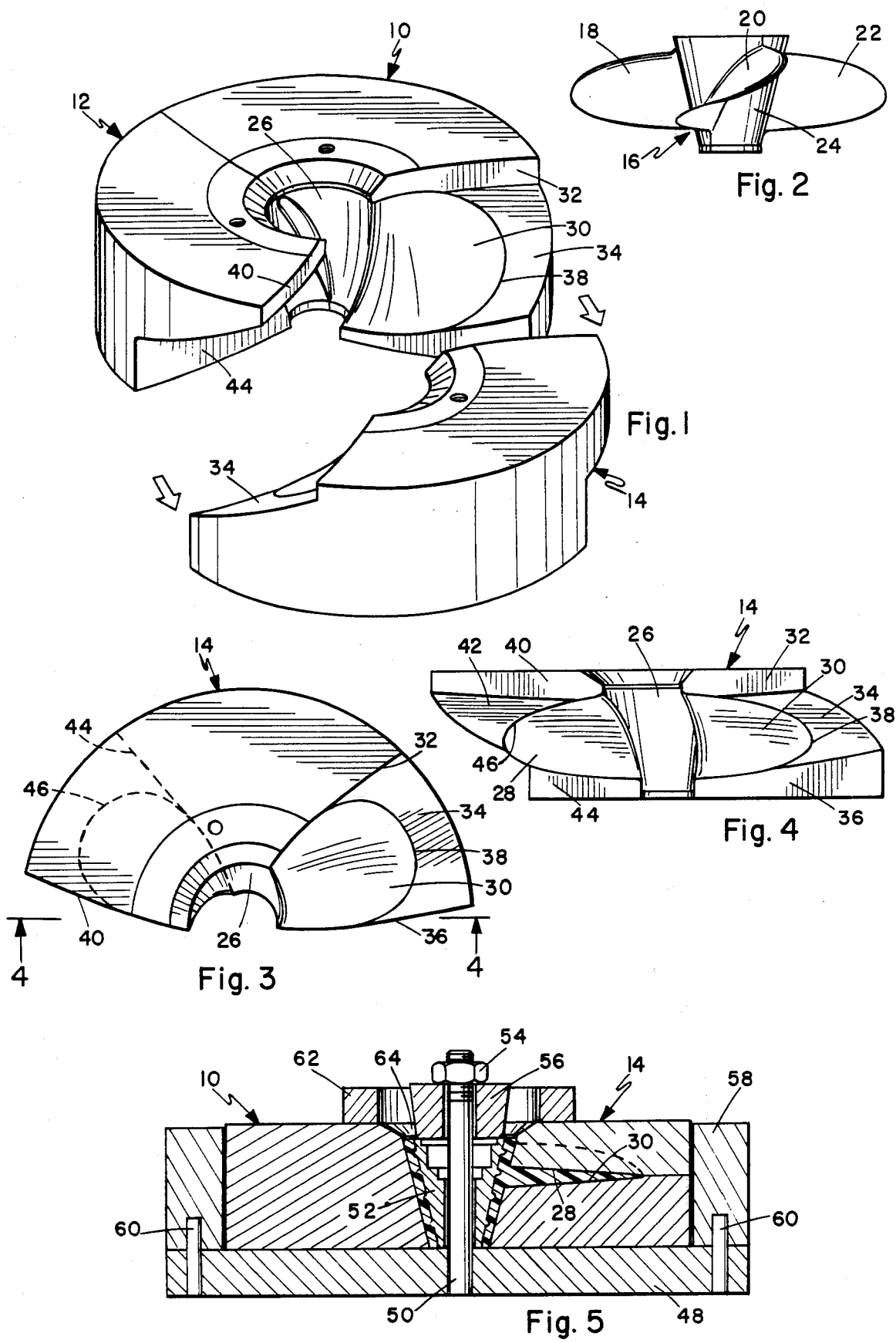

MOLD FOR MOLDING PROPELLERS HAVING TAPERED HUBS

BACKGROUND OF THE INVENTION

In the past, propellers had been made with cylindrical hubs rather than tapered hubs because there was no way to make a tapered hub in the propeller molds which were known heretofore. The prior art propeller molds were made with axially parted mold halves, and with axially parted mold halves there is no way to remove a propeller with a tapered hub from the mold. But propellers with tapered hubs are superior in performance to those with cylindrical hubs, and the principal object of this invention is to provide a mold for molding propellers with tapered hubs.

Another object of this invention is to provide a radially parted mold for propellers in which each parting surface on the mold segment defines a parting line which runs along the edge of a corresponding propeller blade.

Other objects and advantages of the invention will be apparent from the detailed description herein

SUMMARY OF THE INVENTION

The present invention is a radially parted mold comprising a plurality of mold segments each having cavities that taken together define the shape of a propeller with a tapered hub when the mold segments are joined together along their parting surfaces.

BRIEF DESCRIPTION OF THE DRAWINGS

FIG. 1 is a perspective view of the preferred embodiment of the invention with one mold segment separated radially.

FIG. 2 is a side elevation view of a propeller produced by the mold of FIG. 1.

FIG. 3 is a top plan view of one mold segment.

FIG. 4 is a side elevation view of the mold segment shown in FIG. 3 taken on line 4—4 of Figure 3.

FIG. 5 is a diametrical sectional view of the mold assembly of FIG. 1 in a holding fixture.

DESCRIPTION OF THE PREFERRED EMBODIMENT

FIG. 1 is a perspective view of the preferred embodiment of the invention and FIG. 2 is a side elevation view of the propeller molded therein. This particular mold has three mold segments 10, 12 and 14, each of which has cavities therein, which taken together define the shape of a three-bladed marine propeller 16 having three blades 18, 20 and 22 and having a tapered hub 24. The mold segments 10, 12 and 14 are radially parted. FIG. 1 shows the mold segments 10 snd 12 joined together along their parting surfaces with the mold segment 14 being radially parted from the mold segments 10 and 12. In this particular embodiment of the invention there is one mold segment for each blade of the propeller, but this is not an essential feature of the invention since the mold segments 10, 12 and 14 could be divided in two, if desired. The mold segments 10, 12 and 14 form a cylinder when they are joined together along their parting surfaces but this is not an essential feature of the invention since the outer surfaces of the mold segments could be cut in other shapes if desired, according to the needs of a particular application.

FIGS. 3 and 4 show the details of the mold segment 14, which has the same general configuration as the other mold segments 10 and 12. The mold segment 14 has 3 cavities 26, 28 and 30. The cavity 26 defines one-third of tapered hub 24; the cavity 28 defines the front face of one of the propeller blades 18, 20 and 22; and the cavity 30 defines the rear face of an adjacent one of the propeller blades 18, 20 and 22. The side of the mold segment 14 adjacent to the cavity 30 has a parting surface which is divided generally into an upper parting surface 32, a central parting surface 34, a lower parting surface 36, and a parting line 38 which follows the edge of the corresponding propeller blade. The edge of the propeller blade is the centerline of the blade (½ the thickness of the blade). The side of the mold segment 14 which is adjacent to the cavity 28 has a similar parting surface which is divided generally to an upper parting surface 44, and a parting line 46 which follows the edge of the corresponding propeller blade.

FIG. 5 shows how the mold is set up in a fixture for pouring a plastic propeller. The fixture includes a base plate 48 which supports a central alignment shaft 50 which supports a metal hub core 52 having an irregular surface for bonding to plastic. The hub core 52 is clamped to the base plate 48 by a nut 54 and a tapered spacer 56. A retaining ring 58 is attached to the base plate 48 by dowels 60 and serves to hold the mold segments 10, 12 and 14 together during the pouring operation. In this particular example, the retaining ring 58 has a cylindrical shape but the exterior could be other shapes if desired according to the needs of the particular application. A pouring ring 62 is mounted on top of the mold segment 10, 12 and 14, which have tapered surfaces 64 on their inner peripheries to facilitate the pouring of plastic into the combined cavity defined by the three mold segments 10, 12 and 14. The plastic flows into the mold cavities under the influence of the force of gravity. It should be understood, however, that the mold of this invention is not limited to gravity pouring nor to plastic. Molds could be built in the same general pattern for metallic propellers, and the plastic material could be injected into the mold cavity instead of being allowed to settle under the force of gravity.

Having described my invention, I claim:

1. A mold for molding propellers having tapered hubs comprising:
    a plurality of radially parted mold segments each having two parting surfaces defining two parting lines; and
    cavities in said mold segments that define the shape of a propeller having a tapered hub when said mold segments are joined together along their parting surfaces.

2. A mold as defined in claim 1 wherein each of said parting lines run along the edge of a corresponding propeller blade.

3. A mold as defined in claim 1 wherein the number of mold segments is equal to the number of blades on said propeller.

4. A mold as defined in claim 3 wherein each mold segment has a first cavity defining the front face of one propeller blade, a second cavity defining the rear face of an adjacent propeller blade, and a third cavity defining a portion of said tapered hub.

5. A mold as defined in claim 1, also including a base plate for supporting said segments and a retainer ring mounted on said base plate for retaining said mold segments together along their parting surfaces.

6. A mold as defined in claim 5, also including an alignment shaft projecting upwardly from the center of said base plate for holding a propeller hub core in the proper position in the center of said mold.

* * * * *